Sept. 15, 1964 J. P. BEESLEY 3,149,240
CRYOTRON CLIP AND CLAMP CIRCUIT
Filed May 1, 1961 4 Sheets-Sheet 1

INVENTOR
JAMES P. BEESLEY
BY George Baron
ATTORNEY

Sept. 15, 1964 J. P. BEESLEY 3,149,240

CRYOTRON CLIP AND CLAMP CIRCUIT

Filed May 1, 1961 4 Sheets-Sheet 3

Sept. 15, 1964 J. P. BEESLEY 3,149,240

CRYOTRON CLIP AND CLAMP CIRCUIT

Filed May 1, 1961

4 Sheets-Sheet 4

United States Patent Office 3,149,240
Patented Sept. 15, 1964

3,149,240
CRYOTRON CLIP AND CLAMP CIRCUIT
James P. Beesley, Poughkeepsie, N.Y., assignor to International Business Machines Corporation, New York, N.Y., a corporation of New York
Filed May 1, 1961, Ser. No. 106,570
4 Claims. (Cl. 307—88.5)

This invention relates to superconductor circuits in general and more particularly to a means for reducing the effective switching times of superconductor circuits.

Certain materials have the property of conducting electrical currents without presenting any resistance to such electrical currents. These conductors are composed of materials such as tantalum, niobium, lead, and alloys of such materials, and are maintained at temperatures near absolute zero. When such elements are maintained at temperatures at or near absolute zero, and a magnetic field is applied to such elements while they are maintained at such low temperatures, such magnetic field may be sufficient to cause such elements to become resistive to the flow of currents through them. The minimum value of the magnetic field necessary to drive such elements from their superconductive states to their resistive states is called the critical magnetic field. It has also been determined that the raising of the temperature of such elements, while maintaining a constant magnetic field about such elements, will be sufficient to change the elements from their superconductive states to their resistive states. The minimum temperature necessary to produce this change of state from the superconductive state to the resistive state is called the critical temperature.

One superconductive element particularly useful in switching circuits in the cryotron. The cryotron normally comprises a central or gate conductor in the form of a rod about which is wound a control coil, both the gate conductor and the coil being of materials which are normally superconductive at temperatures near absolute zero. It is understood that thin film techniques may be employed to manufacture the control lines, gates, insulating layers, etc. that form cryotrons and their associated circuitry. The description of the invention using a specific fabrication technique does not limit the scope of the invention. If a current of sufficient magnitude is applied to the control coil, the magnetic field produced thereby will cause the gate conductor to change from its superconductive state to its resistive state. The control coil and gate rod form an electrically operated switch which can be changed from a superconductive to a resistive state by the application of current to the control coil. Normally the control coil is composed of a material which does not become resistive for the range of currents it will carry to drive its associated gate rod resistive.

In computer circuitry and/or switching circuits, the gate conductor of one cryotron is connected in series with the control conductor of another cryotron, and each cryotron must provide a current gain for the successful operation of the computer circuitry or switching circuit. In effect, the maximum current carried by the gate conductor and the control conductor without producing resistance therein should be equal to or larger than that required to produce resistance in the gate controlled by the control conductor when the current through such controlled gate is zero. It has been found that the speed at which the gate conductor switches from its superconducting state to its resistive state may be very rapid, perhaps of the order of nanoseconds, but the switching speed of a circuit in which such cryotrons are used is limited by the *L/R* time constants of the circuit, and such latter switching speed is considerably slower than that of the cryotron, per se. The Patent 2,936,435 to Buck for a "High Speed Cryotron" that issued May 10, 1960 discusses the problem of increasing the switching speed of a cryotron circuit by increasing the resistance of the gate conductor of a cryotron while decreasing the inductance of the control winding associated with such gate conductor. The Buck reference is cited merely to present a discussion about the slowness of speed of switching of cryotron circuits in general, as well as a discussion of factors that must be considered in attempting to diminish the switching times of cryotron circuits.

The present invention recognizes that it is desirable to employ driving pulses having relatively large magnitudes and sharp rise times to operate a cryotron gate switching circuit such as a cryotron flip-flop because such currents cause faster transitions of a cryotron in going from the superconductive state to the resistive state. However, such large magnitude pulses, while they speed up the time of switching of one leg of a flip-flop from its superconductive state to its resistive state, have the adverse effect of prolonging the time it takes for a resistive leg to return to its superconductive state. In order to obtain the advantages of large magnitude drive pulses yet not include the concomitant disadvantage of a slow return of a resistive leg to its superconductive state, feedback current paths are provided, during switching and before the drive currents reach a maximum in the drive lines, which cause the effective field produced by a drive line to clamp either to zero, or at a field somewhat larger than that necessary to drive the gate resistive.

Thus, it is an object of this invention to provide an improved cryogenic switching circuit.

It is a further object to provide a faster switching cryogenic gating circuit.

It is yet another object to provide a novel feedback circuit that will produce a clipping and clamping effect in a cryotron circuit.

The foregoing and other objects, features and advantages of the invention will be apparent from the following more particular description of preferred embodiments of the invention, as illustrated in the accompanying drawings.

Figure 1:
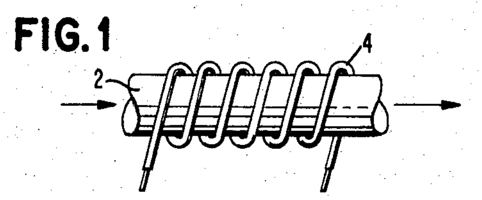
FIG. 1 represents a conventional wire-wound cryotron.

The conventional cryotron shown in FIG. 1 includes a gate conductor 2 about which is wound a control coil 4, both the gate conductor 2 and control coil 4 being of materials which are normally superconductive at temperatures near absolute zero. If a current of sufficient magnitude is applied to the control coil 4, the magnetic field produced thereby will cause the gate conductor 2 to transfer from a superconductive state to a resistive state. Thus the control and gate conductor form an electrically operated switch which can be changed from a superconductive state to a resistive state by the application of a suitable current to the control coil.

In practice, the control coil 4 must not become resistive while it is carrying the current which produces a sufficient field to drive its associated gate 2 resistive. Thus, niobium, which takes a relatively large magnetic field to drive it from a superconductive state to its resistive state, is chosen as the material out of which the control coil is made and tantalum, which requires a relatively small magnetic field to be driven resistive, is chosen for the gate conductor.

It is understood that not only can different materials be chosen for the gate conductors and control coils, but such elements can be made in other forms than wires, rods, or coils. The gate of the present embodiment is a thin film of superconductive material, such as tin, formed by vacuum-deposition techniques and an electrical insulating material (not shown), such as silicon monoxide, is deposited upon such thin film prior to the deposition of the control coil 4, the latter being merely a thin line of superconductive material, such as lead, which will carry the current needed to change the state of its associated thin film gate.

Figure 2:
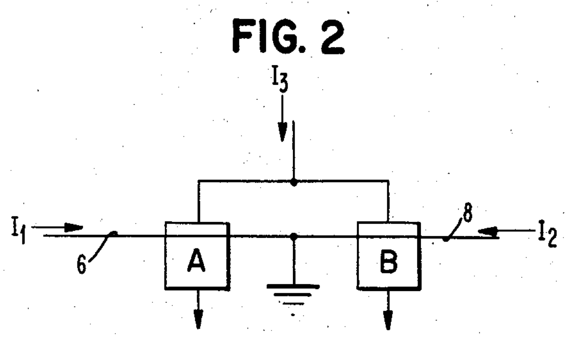
FIG. 2 is a diagrammatic representation of a bistable device employing cryotrons of the type shown in FIG. 1.

In FIG. 2 is seen a conventional two gate cryotron switching circuit comprising two gate elements A and B and the wires or lines 6 and 8 are their respective control lines carrying currents $I_1$ and $I_2$. The sum of $I_1$ and $I_2$ is a constant times the critical controlling current for each gate A or B. Thus $I_1+I_2$ can be made equal to $KI_{co}$ where $I_{co}$ is the critical controlling current for each gate A or B, the critical controlling current being that current carried by drive line 6 or 8 which produces the minimum magnetic field necessary to drive its associate gate A or B to its resistive state when the gate current is zero.

Figure 3:
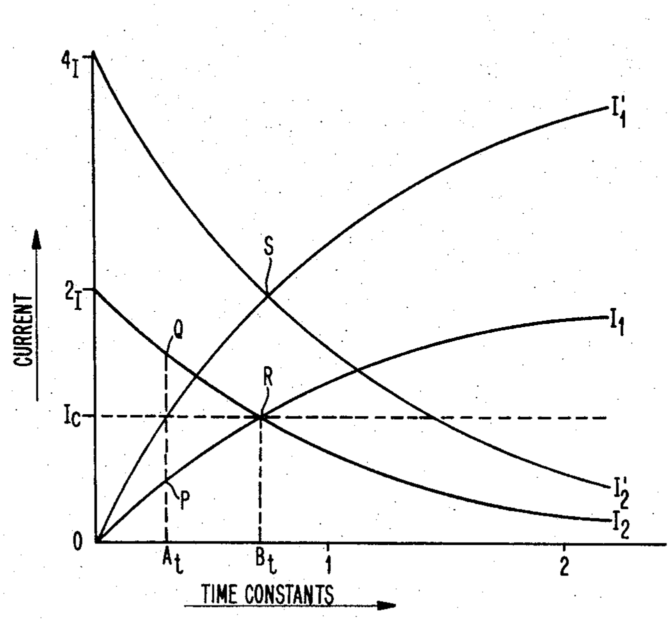
FIG. 3 is a series of curves showing the relationship between the switching currents for two values of supply current, the critical controlling current, and the time constants of a bistable cryogenic circuit.
Figure 4A:
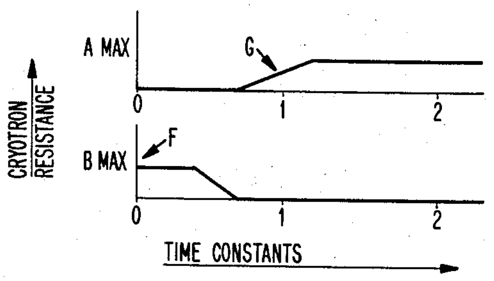
FIGS. 4*a*, 4*b*, 5, 6 and 7 are curves relating time constants of a cryotron switching circuit to current and resistance characteristics of such circuit.
Figure 8:
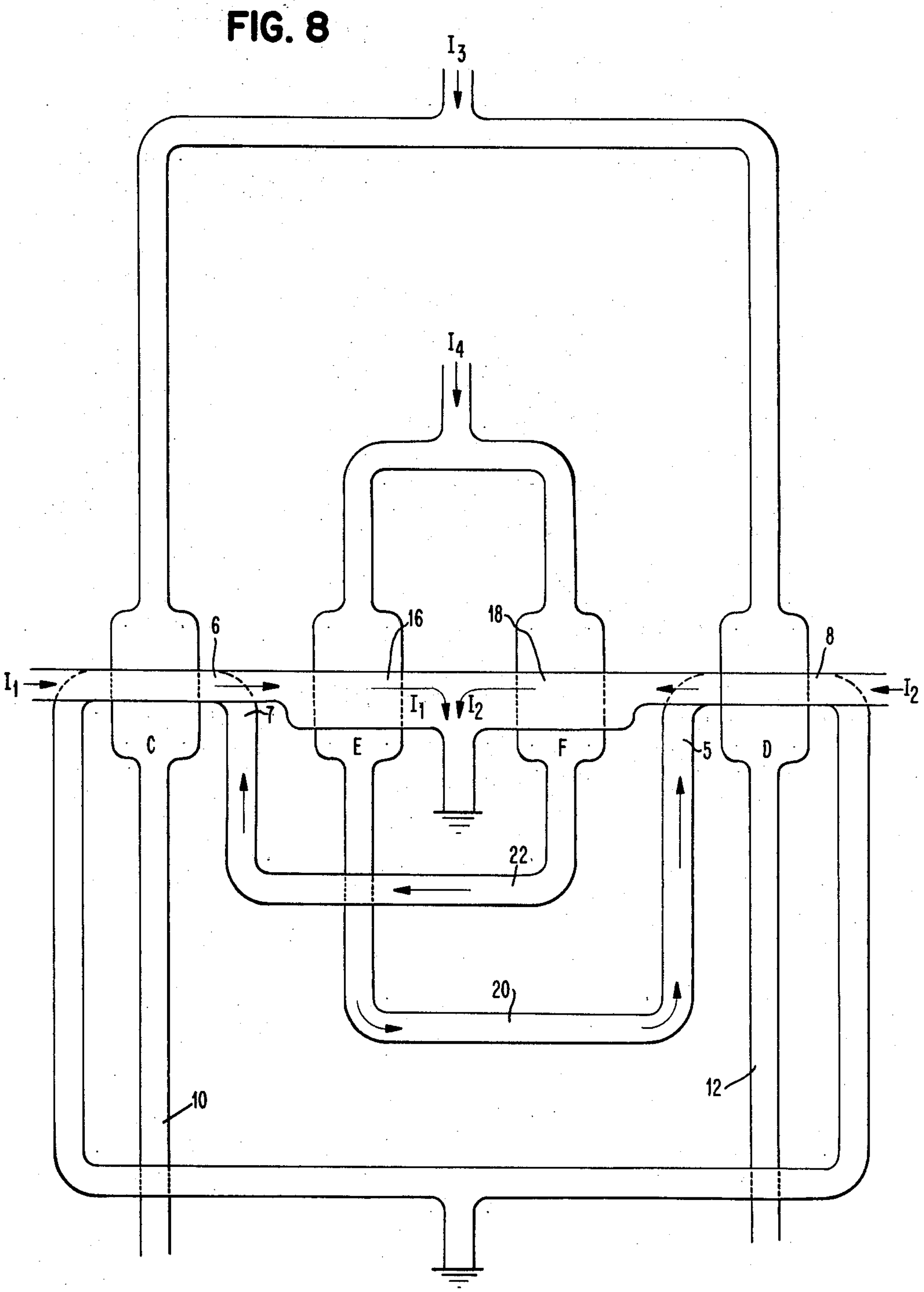
FIG. 8 is a first embodiment of the invention shown in schematic form.
Figure 9:
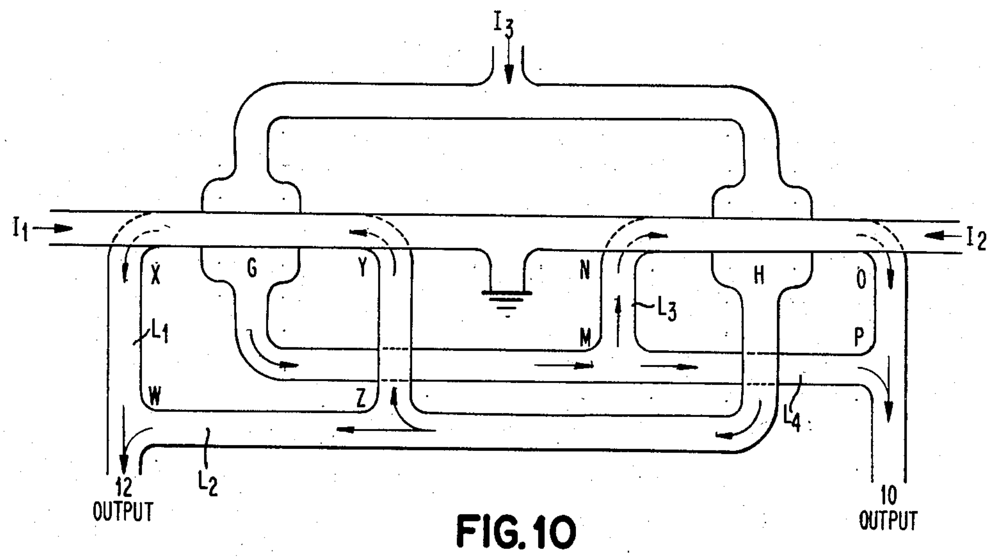
FIG. 9 is another embodiment of the invention shown in schematic form.

FIGS. 3 and 4 will be considered in order to aid in the understanding of the switching time of the conventional cryotron gate switching circuit so as to better appreciate the embodiments of the invention shown in FIGS. 8 and 9. Assume that $I_1+I_2=2I_{co}$. In FIG. 3, there is shown a plot of drive currents $I_1$, $I_2$ versus switching time constants. The horizontal dotted line represents the critical controlling current $I_{co}$ for gates A and B, and $A_t$ in the abscissa of FIG. 3 indicates the time at which gate A becomes resistive for $I_1+I_2=4I$ and $B_t$ represents the time at which gate A becomes resistive and gate B becomes superconductive for $I_1+I_2=2I$. It is seen that as driving current $I_2$ begins to fall, it is still above $I_{co}$ at point Q and curve F (FIG. 4*a*) shows gate B to be resistive, whereas $I_1$ is rising, but at point P, $I_1$ is below the critical controlling current $I_{co}$ so that gate A is still superconductive, as shown by curve G in FIG. 4*a*. As $I_2$ continues to diminish, gate B starts to switch at about 0.4 time constants and goes to completion after about 0.7 time constants of elapsed time. As $I_1$ continues to increase, the two currents $I_1$ and $I_2$ cross at point R, with gate B completing its return to its superconductive state (zero resistance) and gate A beginning its transition (curve G of FIG. 4*a*) to the resistive state at 0.7 time constants of elapsed time and completing the transition at 1.2 time constants of elapsed time. The transition zones in going from one state to another state, as shown in curves F and G of FIG. 4a, are quite broad, being about 0.3 to 0.5 time constants.

Figure 4B:
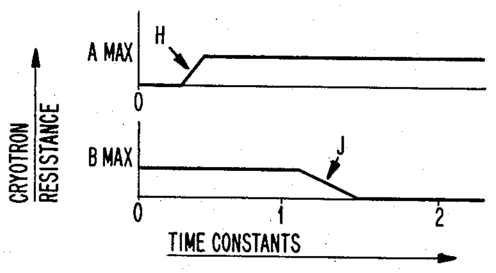

If the driving currents $I_1$ and $I_2$ are increased so that $I_1$ and $I_2=4I_{co}$, then the transition from superconductive to resistive is made smaller as shown in FIG. 4*b*. As seen in FIG. 3, curves $I_1'$ and $I_2'$ have a cross-over point S that represents twice the critical controlling current for either gate A or gate B. As seen in FIG. 4*b*, curve H depicts how the doubling of the value of the drive currents $I_1$ and $I_2$ causes gate A to begin going resistive at 0.29 time constants and completely switch to the resistive state at 0.44 time constants. Curve J depicts how gate B, which has been kept in the resistive state by $I_2'$, begins to return towards the superconductive at 1.1 time constants and reaches the superconductive state after 1.4 time constants. A comparison of curves G, F, H, and J shows that an increase in the speed at which a gate A of conventional cryotron circuitry switches from one state to the other occurs when drive currents are increased in amplitude, but such increased speed of switching is offset by the fact that the higher currents tend to maintain both gates of a bistable cryotron circuit in their respective resistive states during a portion of the switching. Note that when $I_1+I_2=4I_{co}$, curves H and J of FIG. 4*b* reveal that the two gates A and B are simultaneously resistive for a period of about 0.7 time constants. Thus the increased speed of switching a single gate of a flip-flop from its superconductive state to its resistive state by employing higher currents is offset by the increase in time for the other gate of the flip-flop to return to its superconductive state.

Figure 10:
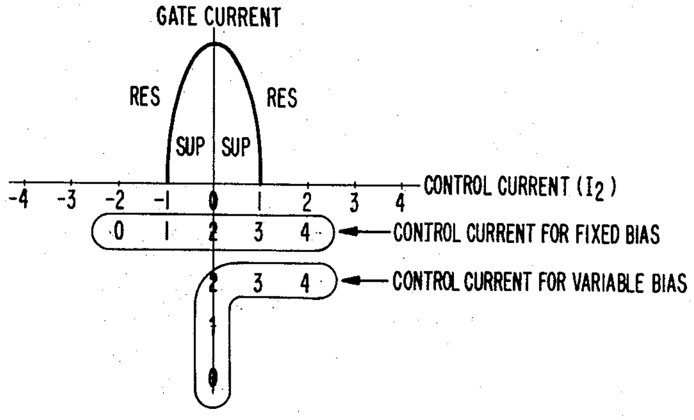
FIG. 10 is a plot of a gain curve of a cryotron showing the effects of bias currents in modifying such gain curve.

FIG. 8, when viewed in conjunction with FIG. 10, illustrates the manner in which a feedback circuit provides a variable bias to a cryotron gate to produce a clipping and clamping effect in a cryotron circuit. Associated with gate D is drive line 8 which widens out to drive line 18 and drive line 6 associated with gate C widens out to drive line 16. The widened portion of the drive lines is employed so that if one unit of current $I_2$ will cause gate D to go resistive, then two units of current $I_2$ are needed to drive gate F resistive. Likewise, if one unit of current $I_1$ is needed to drive gate C resistive, then two units of current $I_1$ are needed to drive gate E resistive. The D.C. power supplies $I_4$ and $I_3$ are related so that $I_4=I/2I_3$ and $I_3=I_1+I_2$. When $I_2$ is a maximum, e.g., $I_1=0$, then $I_2=2I_4$.

Operation of FIG. 8 will now be described. Assume that $I_2$ that is flowing through drive line 8 is at four units of current (see FIG. 10) and only one unit of current is needed to drive gate D resistive and two units of current are needed to drive gate F resistive. Consequently gates D and F are in their respective resistive states and gates C and E, with $I_1$ equal to zero, are in their respective superconductive states. Since gate E is in its superconductive state, the full value of current $I_4$ is fed back through feedback line 20 so that the effective drive current for gate D and gate F is $I_2-I_4$. An effective value of two units of $I_2$ current is sufficient to maintain gates D and F in their respective resistive states. As $I_2$ begins to fall in amplitude, the full biasing effect of feedback current $I_4$ is still being applied through line 20 to gate D. When $I_2$ has dropped to a value of three units of current, such bias through line 20 flows through a control line 5 to oppose current $I_2$ and creates an effective current of one unit of current which is just enough to maintain gate D resistive. Meanwhile, $I_1$ is up to one unit of current, causing gate C to begin switching toward its resistive state. As soon as $I_2$ is less than three units of current, gate D returns to its superconductive state. When $I_2$ becomes less than two units of current, gate F becomes superconductive.

The increase of $I_1$ to two units or more of current as $I_2$ is diminishing causes gate E to go resistive, diverting $I_4$ through gate F so as to apply a biasing current through feedback line 22 to a control line 7 in opposition to the current in control line 6 of gate C. The bias of two units of current through line 22 opposes the effect of current $I_1$ so that $I_1$ needs to diminish by only one unit of current to allow gate C to become superconductive. The switching of gate C to the resistive state and gate D to the superconductive state diverts current $I_3$ from line 10 to line 12.

Figure 11:
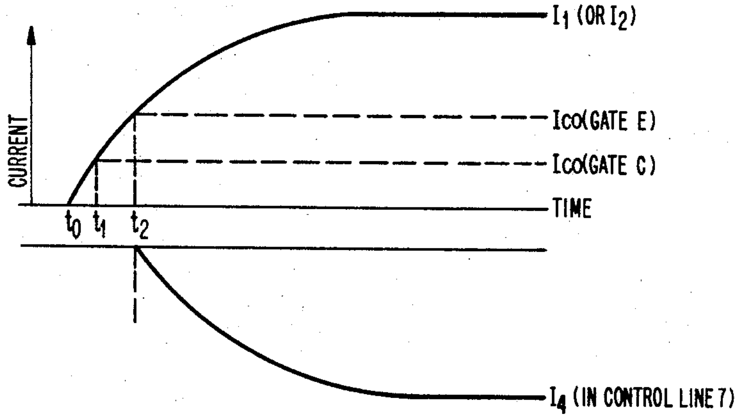
FIG. 11 depicts the clipping and clamping action of the invention.

A study of FIGS. 10 and 11 will illustrate how the feedback circuit operates to increase the switching speed of a cryotron flip-flop. Without any feedback bias and the use of a large driving current $I_2$, the cryotron switching, as discussed hereinabove, for a cryotron flip-flop is shown in FIG. 4*b* with the undesirable overlap of resistant stakes for the two gates such as gates C and D. If a fixed bias were to be used for both gates C and D, there would be a period, as seen in FIG. 10, when both gates C and D would be resistive, namely, when $I_2$ was between three and four units of current and $I_1$ was between 0 and 1 unit of current. This overlapping of resistive states, when using fixed bias, will prevent the switching of $I_3$ current between line 12 and line 10, and vice versa.

Figure 5:
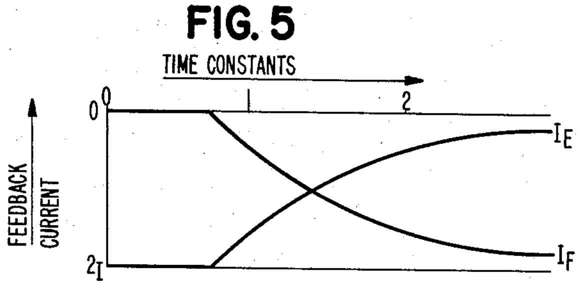

However, by employing the feedback circuit shown and described herein, when $I_2$ (FIGS. 6 and 8) diminishes from two units of current to no units of current, feedback current ($I_E$, FIG. 5) along line 20 of FIG. 8 also diminishes and the effective control current for gate D of FIG. 8 remains approximately zero (FIG. 6), thus allowing gate D to remain superconductive. The variable bias serves to more rapidly return a gate to, and maintain it in, its superconductive state despite the presence of a desirable high driving current $I_1$ or $I_2$.

Figure 6:
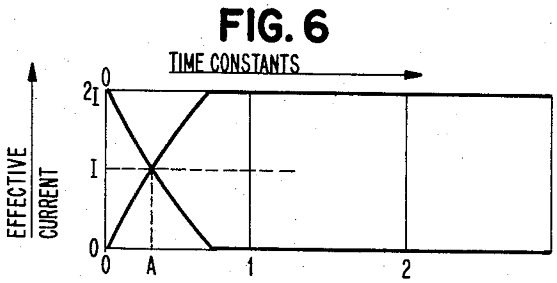
Figure 7:
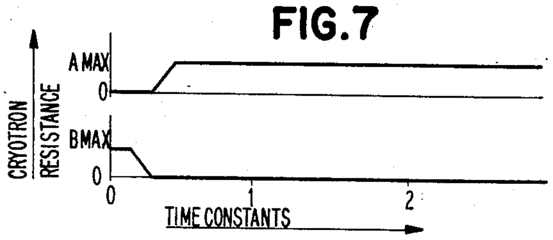

The clipping and clamping effect of the invention can be also understood by reference to FIG. 11. The curve labeled $I_1$ (or $I_2$) represents the relatively high control current desired in order to start the rapid switching from the superconductive state to the resistive state of either gate C or D of FIG. 8 so that $I_3$ can transfer from output line 12 to output line 10, and vice versa. $I_1$ shows a rapid rise from $t_0$ to $t_1$, causing the critical controlling current $I_{co}$ to drive its associated gate C resistive and begin the transfer of $I_3$ from output line 10 to output line 12. At $t_2$, gate E goes resistive so that $I_4$ is diverted through gate F and feedback path 22 to oppose the increasing driving current $I_1$. Since $I_4$ is in opposition to $I_1$, the driving current $I_1$ with respect to gate C is effectively clipped and clamped at the value of $I_m$ which has been shown throughout the illustrated graphs and noted in the specification to be $21_{co}$ for gate C. Other values for $I_m$ can be selected and such selection is a matter of design. Thus the feedback circuit of FIG. 8 attains the benefit of permitting a relatively fast-rising current to be used as a driving control current to obtain rapid switching of a cryotron gate from a superconductive state to the resistive state, yet supply a variable bias for reducing the delay involved in returning a resistive gate to its superconductive state when the gate is under the influence of such large magnitude, fast-rising current. It is noted that the feedback currents change their paths simultaneously but they do not change at the same time that gates C and D change their states. FIGS. 6 and 7 show how the feedback circuits employed attain the benefits of high amplitude drive currents without their concomitant defects.

The circuit of FIG. 9 is schematic but is constructed in a manner similar to that shown in FIG. 8 with the gates and drive lines being formed of thin films of cryogenic material separated by layers of insulation such as silicon monoxide. The embodiment shown in FIG. 9 relies upon the principle that if current is made to flow into two parallel superconductive paths, the current divides inversely as the inductances of said two paths. The current division so obtained is used to produce the clipping and clamping effect attained by the embodiment shown in FIG. 8, but without the delay in the build-up of the opposing driving currents and fields beyond the point at which the D.C. current starts switching. The feedback path of current $I_3$ through gate H includes a first inductive path $L_1$ that starts at Z and takes the path including YXW and a second inductive path $L_2$ that goes from Z to W. A third inductive path $L_3$ is MNOP and a fourth inductive path $L_4$ is MP. The inductances are chosen, merely to illustrate the invention, so that $L_1=L_2=L_3=L_4$.

For purposes of illustration, let $I_2=I_3$ and $I_1=0$. When $I_3$ flows through gate G, drive current affecting gate H is $$I_2-\frac{I_3}{2}$$

The net effect of driving current on gate H is $(1/2)I_3$. Also, let an effective drive current of $(1/4)I_3$ be sufficient to maintain either gate G or H resistive. Then, gate H is in its resistive state when $I_2$ is at a maximum and the full effect of feedback current passes through inductance $L_3$. As $I_2$ begins to diminish, $I_1$ begins to increase. As soon as the exponentially increasing current $I_1$ reaches the critical controlling current for gate G, $I_3$ current through gate G begins to diminish exponentially. As current through gate G diminishes exponentially, feedback current through $L_3$ and $L_4$ begins diminishing exponentially. Since $I_2$ is diminishing exponentially at the same time that feedback current through inductance $L_3$ (path MNOP) is diminishing and the rate of diminution of $I_2$ is greater than the rate of diminution of feedback current through $L_3$, such feedback current maintains gate H in its superconductive state and prevents its return to the resistive state unless switched again. The passage of current $I_3$ through gate H causes feedback current to build up through inductances $L_1$ and $L_2$ until the final feedback current affecting gate G is such that the net driving current for gate G is $(1/2)I_3$, sufficient to keep gate G in its resistive state.

In FIG. 8, output current from lines 10 and 12 started changing when $I_1$ and $I_2$ each changed one unit out of a total of a four unit change, but feedback currents through gates E and F did not start changing until the $I_1$ and $I_2$ currents had changed two units out of a four unit change. In FIG. 9, the output currents from lines 10 and 12 and feedback currents from gates G and H start changing simultaneously when the input drive currents $I_1$ and $I_2$ have changed one unit out of four units of change.

While the invention has been particularly shown and described with reference to preferred embodiments thereof, it will be understood by those skilled in the art that various changes in form and details may be made therein without departing from the spirit and scope of the invention.

What is claimed is:

1. A bistable circuit comprising two main gating elements and two auxiliary gating elements all having superconductivity transition conditions, a first control element operatively associated with a first main gating element and a first auxiliary gating element, said first control element, when carrying a unit of current, applying more magnetomotive force per unit area to the main gating element than to the auxiliary gating element, a second control element operatively associated with a second main gating element and a second auxiliary gating element, said second control element, when carrying a unit of current, applying more magnetomotive force per unit area to the main gating element than to the auxiliary gating element, and means for feeding current flowing through said second auxiliary gating element back into control relation to said first main gating element to oppose the magnetomotive effect of the current in said first control element, and means for feeding current flowing through said first auxiliary gating element back into control relation to said second main gating element so as to oppose the magnetomotive effect of the current in said second control element.

2. A bistable circuit comprising two gating elements having superconductivity transition conditions, a drive line associated with each gating element, means for applying a current to one of said drive lines considerably more than sufficient to destroy the superconductivity of its associated gating element, and means for feeding back gate current of the other of said gating elements as an opposition current to the driving current of said one drive line whereby such feedback current causes the effective field induced by the drive current in said associated gating element to clamp to that value close to the minimum critical field necessary to drive such gating element resistive.

3. A bistable circuit comprising two gating elements having superconductivity transition conditions, a first control element operatively associated with each gating element, means for applying a current to one of said first control elements sufficient to destroy the superconductivity of its associated gate, means for continuing each gating element as a second control element for the other gating element, said first and second control elements being disposed in magnetic field opposition to each other with respect to their respective gating elements, whereby the gating current through whichever of said gating elements is superconductive opposes the effect of the current through said first control element of the other gating element.

4. A bistable circuit comprising two gating elements having superconductivity transistion conditions, a control element operatively associated with each gating element, means for applying a current to one of said control elements sufficient to destroy the superconductivity of its associated gate, two pairs of parallel inductive paths, means connecting one gating element in series circuit with one pair of parallel inductive paths and the other gating element in series circuit with the other pair of parallel inductive paths, each of said pairs of said parallel paths being so located with its series connected gating element so as to divide the gating current thereof and having one of said parallel paths disposed to affect the transition characteristics of the other gate by carrying gating current that is in magnetic field opposition to the current being carried by the control element of the same.

References Cited in the file of this patent

UNITED STATES PATENTS 2,832,897 Buck ------------------- Apr. 28, 1958
3,020,489 Walker et al. ------------ Feb. 6, 1962